US008649603B2

(12) United States Patent
Ogasawara et al.

(10) Patent No.: US 8,649,603 B2
(45) Date of Patent: Feb. 11, 2014

(54) COMPUTER-READABLE STORAGE MEDIUM HAVING INFORMATION PROCESSING PROGRAM STORED THEREIN, INFORMATION PROCESSING METHOD, INFORMATION PROCESSING APPARATUS, AND INFORMATION PROCESSING SYSTEM

(75) Inventors: Hiroyuki Ogasawara, Chiyoda-ku (JP); Katsunori Orimoto, Chiyoda-ku (JP)

(73) Assignees: Nintendo, Co., Ltd., Kyoto (JP); Creatures Inc., Tokyo (JP)

( * ) Notice: Subject to any disclaimer, the term of this patent is extended or adjusted under 35 U.S.C. 154(b) by 333 days.

(21) Appl. No.: 13/176,942

(22) Filed: Jul. 6, 2011

(65) Prior Publication Data
US 2012/0257788 A1    Oct. 11, 2012

(30) Foreign Application Priority Data
Apr. 8, 2011    (JP) .................................. 2011-086799

(51) Int. Cl.
*G06K 9/00*    (2006.01)
(52) U.S. Cl.
USPC ............ 382/181; 345/694; 711/203; 715/757
(58) Field of Classification Search
USPC ......... 382/100, 103, 181, 190, 195, 294, 302; 345/694, 695; 711/203; 715/757, 771
See application file for complete search history.

(56) References Cited

U.S. PATENT DOCUMENTS

| | | | |
|---|---|---|---|
| 5,781,653 A * | 7/1998 | Okubo .......................... | 382/135 |
| 6,993,158 B2 * | 1/2006 | Cho et al. ...................... | 382/103 |
| 7,076,116 B2 * | 7/2006 | Horie ............................. | 382/284 |
| 7,177,447 B2 * | 2/2007 | Olson et al. ................... | 382/103 |
| 7,929,729 B2 * | 4/2011 | Huang et al. .................. | 382/103 |
| 8,457,411 B2 * | 6/2013 | Arnz ............................. | 382/199 |
| 2006/0280361 A1 * | 12/2006 | Umeda ......................... | 382/167 |
| 2008/0310729 A1 * | 12/2008 | Yoshino ........................ | 382/194 |
| 2009/0097704 A1 * | 4/2009 | Savidge et al. ............... | 382/103 |

OTHER PUBLICATIONS

Hirokazu Kato, Mark Billinghurst, Koichi Asano, and Keihachiro Tachibana, "An Augmented Reality System and its Calibration based on Marker Tracking", Journal of the Virtual Reality Society of Japan, vol. 4, No. 4, 1999, with a partial English translation, 12 pages.
Notice of Allowance (28 pgs.) dated Sep. 11, 2013 issued in co-pending U.S. Appl. No. 13/176,238.

(Continued)

*Primary Examiner* — Anand Bhatnagar
(74) *Attorney, Agent, or Firm* — Nixon & Vanderhye, P.C.

(57) ABSTRACT

A computer-readable storage medium has stored therein an information processing program that causes a computer of an information processing apparatus to operate as: means for sequentially obtaining an image; means for detecting a specific object from the obtained image; means for detecting, on the basis of a first threshold and a pixel value obtained from a first region of the detected specific object, first region information on the first region; calculation means for calculating a second threshold on the basis of the pixel value obtained from the first region when the first region information is detected; means for detecting, on the basis of the second threshold calculated by the calculation means and a pixel value obtained from a second region of the detected specific object that is different from the first region, second region information on the second region; and means for outputting at least the second region information detected.

19 Claims, 9 Drawing Sheets

(56) References Cited

OTHER PUBLICATIONS

Fiala, Mark, "Designing highly reliable fiducial markers." Pattern Analysis and Machine Intelligence, IEEE Transactions on 32.7 (2010): 1317-1324.

Fiala, Mark, "Comparing artag and artoolkit plus fiducial marker systems." Haptic Audio Visual Environments and their Applications, 2005. IEEE International Workshop on IEEE, 2005.

Boulanger, Pierre, "Application of Augmented Reality to Industrial Tele-Training." CRV. 2004.

* cited by examiner

F I G. 3
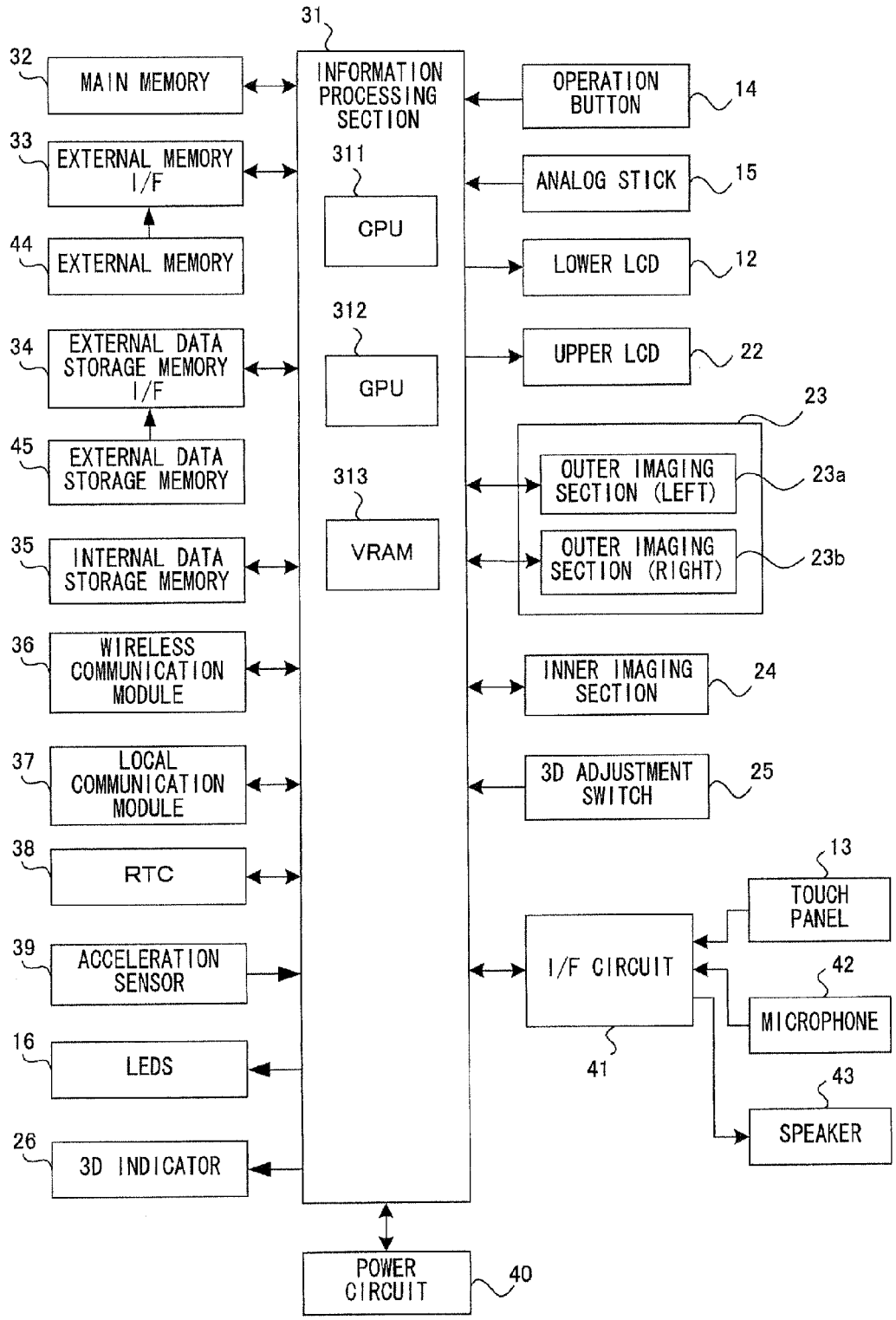

F I G. 4 E
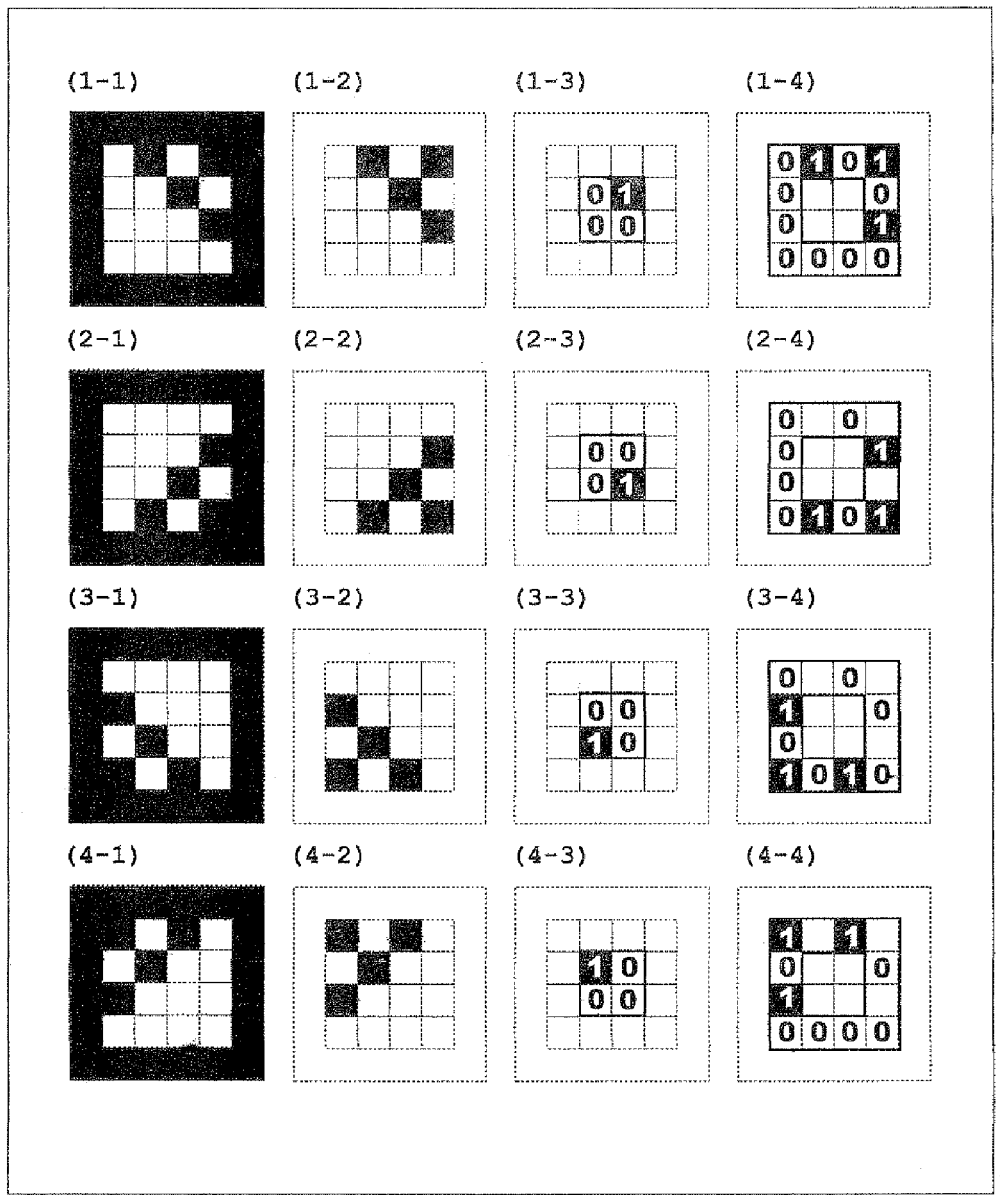

COMPUTER-READABLE STORAGE MEDIUM HAVING INFORMATION PROCESSING PROGRAM STORED THEREIN, INFORMATION PROCESSING METHOD, INFORMATION PROCESSING APPARATUS, AND INFORMATION PROCESSING SYSTEM

CROSS REFERENCE TO RELATED APPLICATION

The disclosure of Japanese Patent Application No. 2011-86799, filed on Apr. 8, 2011, is incorporated herein by reference.

BACKGROUND

1. Field

Example embodiments of present invention relate to a computer-readable storage medium having an information processing program stored therein, an information processing method, an information processing apparatus, and an information processing system. Specifically, example embodiments of the present invention relate to a computer-readable storage medium having an information processing program stored therein, an information processing method, an information processing apparatus, and an information processing system in an augmented reality technique.

2. Description of the Background Art

In the conventional art, there is a technique in which a marker is detected from an image of the real world taken by a camera, three-dimensional position information of the detected marker is calculated, and a virtual object is displayed at a position in the taken image corresponding to the marker on the basis of the three-dimensional position information obtained as a result of the calculation (e.g., see Hirokazu Kato, Mark Billinghurst, Koichi Asano, and Keihachiro Tachibana, "An Augmented Reality System and its Calibration based on Marker Tracking", Journal of the Virtual Reality Society of Japan, Vol. 4, No. 4, 1999 (hereinafter, referred to as Non-Patent Document 1).

However, in an information processing apparatus as disclosed in Non-Patent Document 1, there is the possibility that pixel values in a taken image change depending on the surrounding environment, and in this case, a pattern of the marker may not be accurately recognized. In other words, there is room for improvement in accuracy of marker recognition.

SUMMARY

Therefore, example embodiments of the present invention provide a computer-readable storage medium having an information processing program stored therein and like, which have improved accuracy of marker recognition.

Embodiments of present invention can be provided, as an example, in the following aspects. The following specific description is in all aspects illustrative for the understanding of the extent of example embodiments of the present invention, and is not intended to be limited thereto. That is, it is understood that, from the specific description, the one skilled in the art can implement example embodiments of the present invention in the equivalent range based on the description of example embodiments of the present invention and on the common technological knowledge.

In one aspect of example embodiments of the present invention, example embodiments of the present invention provide a computer-readable storage medium having an information processing program stored therein. The information processing program causes a computer of the information processing apparatus to operate as image obtaining means, specific object detection means, first region information detection means, calculation means, second region information detection means, and output means.

The image obtaining means sequentially obtains an image. The specific object detection means detects a specific object from the image obtained by the image obtaining means. The first region information detection means detects, on the basis of a first threshold and a pixel value obtained from a first region of the specific object detected by the specific object detection means, first region information on the first region. The calculation means calculates a second threshold on the basis of the pixel value obtained from the first region when the first region information is detected by the first region information detection means. The second region information detection means detects, on the basis of the second threshold calculated by the calculation means and a pixel value obtained from a second region of the specific object detected by the specific object detection means which second region is different from the first region, second region information on the second region. The output means outputs at least the second region information detected by the second region information detection means.

In one embodiment, the first region is a central region of the specific object; and the second region is a region surrounding the central region.

In various embodiments, the information processing program may further cause the computer to operate as first threshold calculation means for calculating the first threshold on the basis of pixel values of the image obtained by the image obtaining means. In this case, the first region information detection means detects the first region information on the basis of the pixel value obtained from the first region and the first threshold calculated by the first threshold calculation means.

In various embodiments, the specific object detection means may detect the specific object on the basis of the first threshold and pixel values obtained from the image obtained by the image obtaining means.

In various embodiments, the first region may include at least a first subregion in which first information is detectable and a second subregion in which second information is detectable. The calculation means may calculate the second threshold on the basis of a pixel value within the first subregion and a pixel value within the second subregion when at least the first region information is detected by the first region information detection means.

In the above embodiments, the calculation means may calculate the second threshold on the basis of a brightness value within the first subregion and a brightness value within the second subregion when at least the first region information is detected by the first region information detection means.

In the above embodiments, the calculation means may calculate, as the second threshold, an average of the brightness value within the first subregion and the brightness value within the second subregion when at least the first region information is detected by the first region information detection means.

In various embodiments, the output means may output the first region information detected by the first region information detection means and the second region information detected by the second region information detection means.

In various embodiments, the information processing program may further cause the computer to operate as processing means for performing predetermined information processing on the basis of the first region information and the second region information that are outputted by the output means.

The processing means may select one piece of image data from a plurality of pieces of image data on the basis of identification information that includes the first region information and the second region information, and may display an image indicated by the selected piece of image data, on a display device.

In the above embodiments, the processing means may display the image indicated by the selected piece of image data on the display device such that the image indicated by the selected piece of image data is superimposed on the image sequentially obtained by the image obtaining means.

In various embodiment, the information processing program may further cause the computer to operate as error detection information detection means and determination means. The error detection information detection means detects error detection information for detecting an error of the second region information on the basis of the second threshold and the pixel value obtained from the second region. The determination means determines whether or not the second region information meets a predetermined condition, by comparing the second region information to the error detection information. The output means outputs at least the second region information when a result of the determination by the determination means is positive.

In one embodiment, the first threshold may be a predetermined value.

In one embodiment, each of the first region information and the second region information can be identification information for identifying the specific object.

In one embodiment, the image obtaining means can sequentially obtain the image from an imaging device connected to the information processing apparatus.

In addition, in another aspect, the computer-readable storage medium, described above, having the information processing program stored therein may be used as an apparatus executing the image processing program, or as a system including one or more apparatuses that can communicate with each other. Further, example embodiments of the present invention include a method that can be implemented in the computer-readable storage medium having the information processing program stored therein, the apparatus, or the system.

As used herein, the term "computer-readable storage medium" indicates any apparatus or medium capable of storing a program, a code, and/or data to be used in a computer system. The computer-readable storage medium may be any one of a volatile device and a nonvolatile device as long as it can be read by a computer system. Examples of computer-readable storage media include a magnetic tape, a hard disc drive (HDD), a compact disc (CD), a digital versatile disc (DVD), a Blu-ray disc (BD), a semiconductor memory, but example embodiments of the present invention are not limited thereto.

As used herein, the term "system" (for example, a game system, or an information processing system) may include one apparatus, or may include a plurality of apparatuses each of which can communicate with another one of the apparatuses.

According to example embodiments of the present invention, the storage medium and the like that have improved accuracy of marker recognition are provided.

These and other objects, features, aspects and advantages of example embodiments of the present invention will become more apparent from the following detailed description of the example embodiments of present invention when taken in conjunction with the accompanying drawings.

BRIEF DESCRIPTION OF THE DRAWINGS

FIG. 3 is a block diagram illustrating an internal configuration of the game apparatus 10;

FIG. 4E is a schematic diagram for illustrating a process of recognizing the example of the marker 60 shown in FIG. 4D;

DESCRIPTION OF THE EXAMPLE EMBODIMENTS (Example of Structure of Game Apparatus)

Figure 1:
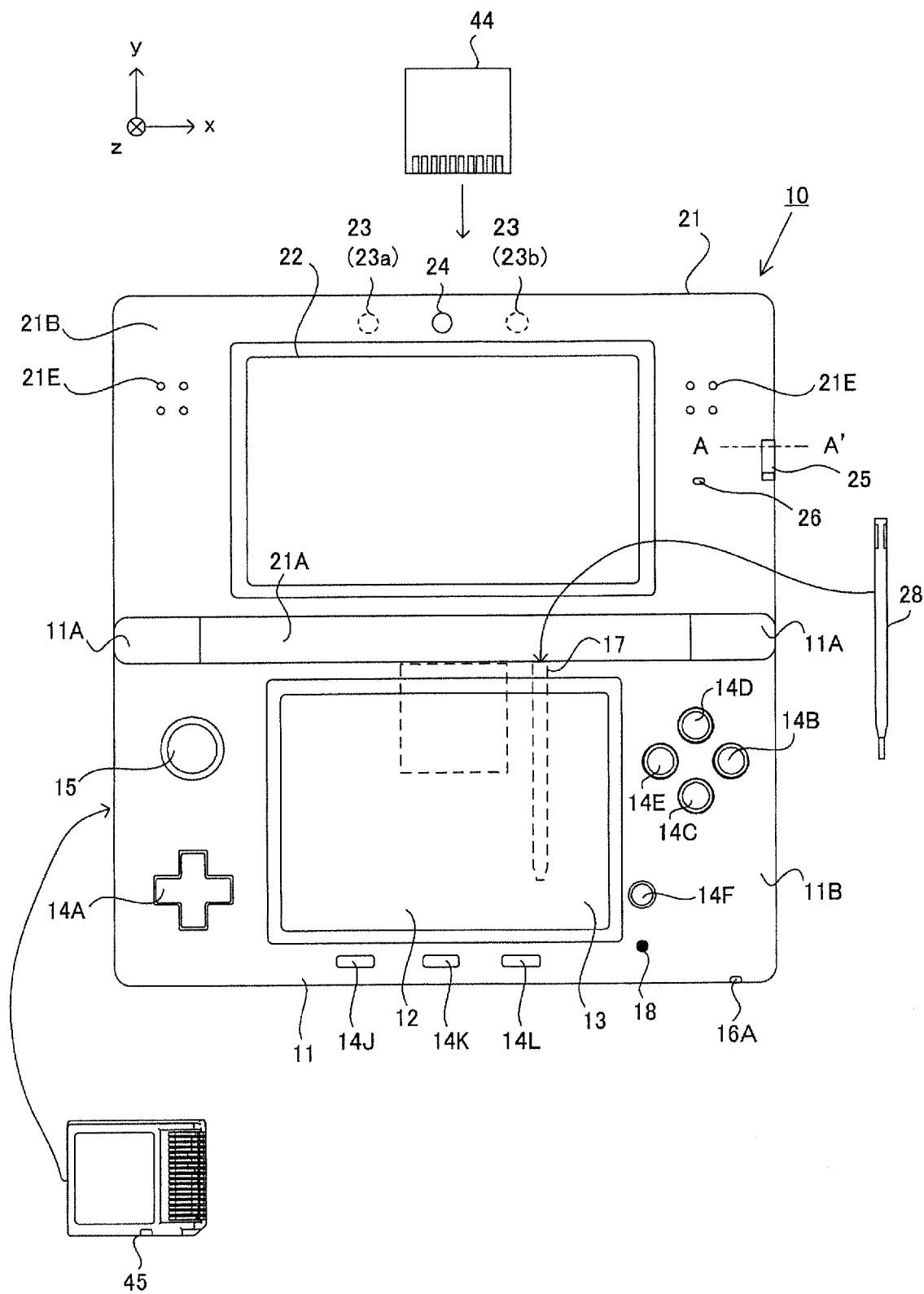
FIG. 1 is a front view of a game apparatus 10 in an opened state.
Figure 2:
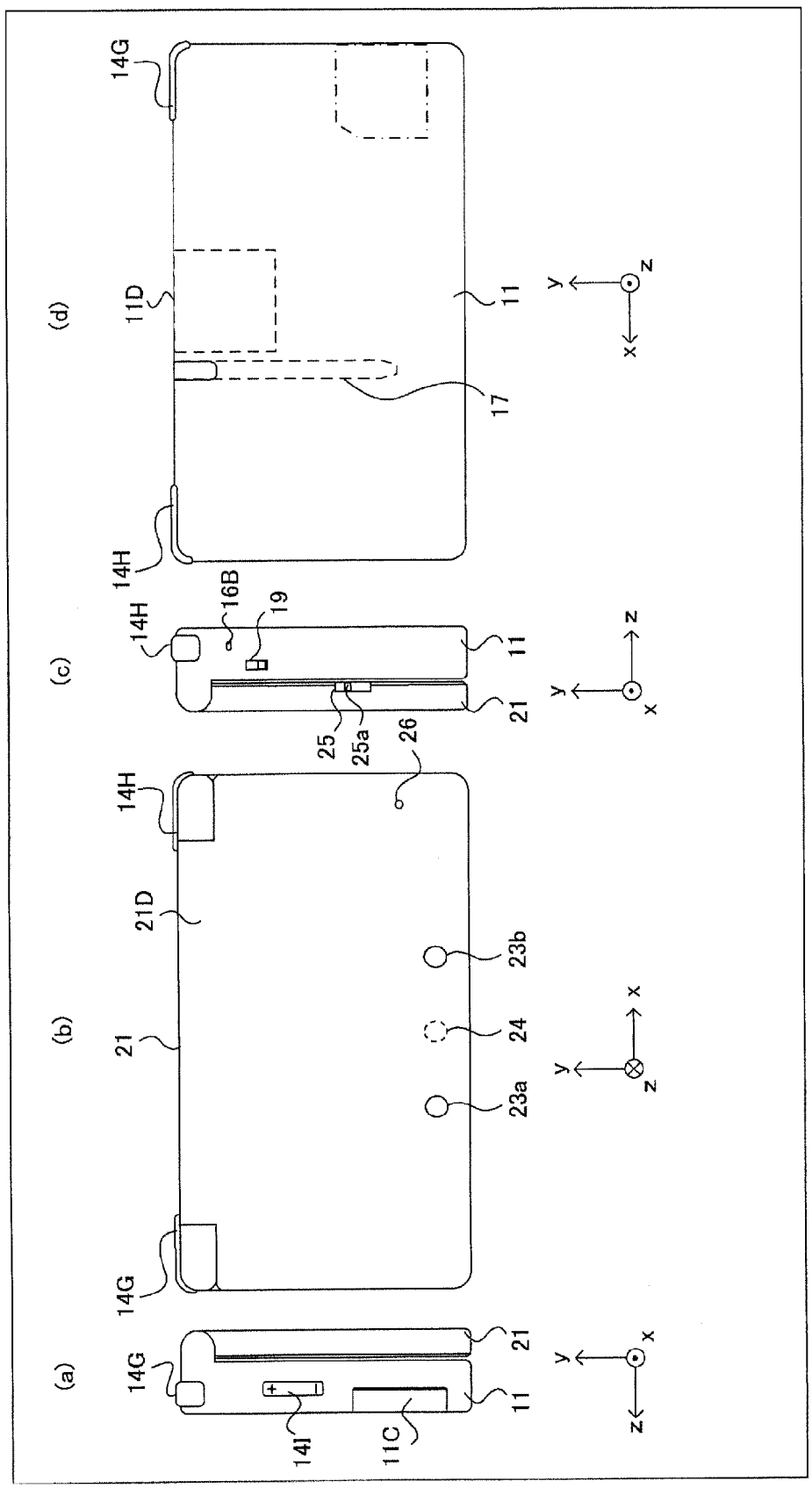
FIG. 2 is a left side view, a front view, a right side view, and a rear view of the game apparatus 10 in a closed state.

Hereinafter, a game apparatus according to one exemplified embodiment of the present invention will be described. FIGS. 1 and 2 are each a plan view of an outer appearance of a game apparatus 10. The game apparatus 10 is a hand-held game apparatus, and is configured to be foldable as shown in FIGS. 1 and 2. FIG. 1 shows the game apparatus 10 in an opened state, and FIG. 2 shows the game apparatus 10 in a closed state.

FIG. 1 is a front view of the game apparatus 10 in the opened state. The game apparatus 10 is able to take an image by means of an imaging section, display the taken image on a screen, and store data of the taken image. The game apparatus 10 can execute a game program which is stored in an detachable memory card (e.g., a below-described external memory 44) or a game program which is received from a server or another game apparatus or stored in a built-in storage area (e.g., a below-described internal data storage memory 35), and can display, on the screen, an image generated by computer graphics processing, such as an image taken by a virtual camera set in a virtual space, for example.

Initially, an external structure of the game apparatus 10 will be described with reference to FIGS. 1 and 2. The game apparatus 10 includes a lower housing 11 and an upper housing 21 as shown in FIGS. 1 and 2. The lower housing 11 and the upper housing 21 are connected to each other so as to be openable and closable (foldable).

(Description of Lower Housing)

Initially, a structure of the lower housing 11 will be described. As shown in FIGS. 1 and 2, in the lower housing 11, a lower LCD (Liquid Crystal Display) 12, a touch panel 13, operation buttons 14A to 14L, an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The number of pixels of the lower LCD 12 may be, for example, 320 dots×240 dots (the longitudinal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIGS. 1 and 2(d)) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A (a direction input button 14A), a button 14B, a button 14C, a button 14D, a button 14E, a power button 14F, a selection button 143, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction. The analog stick 15 has a top, corresponding to a key, which slides parallel to the inner side surface of the lower housing 11. The analog stick 15 acts in accordance with a program executed by the game apparatus 10. For example, when a game in which a predetermined object appears in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Further, the microphone hole 18 is provided on the inner side surface of the lower housing 11. Under the microphone hole 18, a microphone 42 (see FIG. 3) is provided as a sound input device described below, and the microphone 42 detects for a sound from the outside of the game apparatus 10.

FIG. 2(a) is a left side view of the game apparatus 10 in the closed state. FIG. 2(b) is a front view of the game apparatus 10 in the closed state. FIG. 2(c) is a right side view of the game apparatus 10 in the closed state. FIG. 2(d) is a rear view of the game apparatus 10 in the closed state. As shown in FIGS. 2(b) and 2(d), an L button 14G and an R button 14H are provided on the upper side surface of the lower housing 11 The L button 14G and the R button 14H can act, for example, as shutter buttons (imaging instruction buttons) of the imaging section. Further, as shown in FIG. 2(a), a sound volume button 14I is provided on the left side surface of the lower housing 11. The sound volume button 14I is used for adjusting a sound volume of a speaker of the game apparatus 10.

As shown in FIG. 2(a), a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10.

Further, as shown in FIG. 2(d), an insertion opening 11D through which the external memory 44 having the game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10.

Further, as shown in FIGS. 1 and 2(c), a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (see FIG. 2(c)).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIGS. 1 and 2, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The number of pixels of the upper LCD 22 may be, for example, 800 dots×240 dots (the horizontal line×the vertical line). Although, in the present embodiment, the upper LCD 22 is an LCD, a display device using an EL (Electra Luminescence), or the like may be used. In addition, a display device having any resolution may be used as the upper LCD 22.

The upper LCD 22 is a display device capable of displaying a stereoscopically visible image. Further, in the present embodiment, an image for a left eye and an image for a right eye are displayed by using substantially the same display area. Specifically, the upper LCD 22 may be a display device using a method in which the image for a left eye and the image for a right eye are alternately displayed in the horizontal direction in predetermined units (for example, every other line). Further, in the present embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image (a stereoscopic image) which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D.

The outer imaging section (left) 23a and the outer imaging section (right) 23b can be used as a stereo camera depending on a program executed by the game apparatus 10. Each of the outer imaging section (left) 23a and the outer imaging section (right) 23b includes an imaging device, such as a CCD image sensor or a CMOS image sensor, having a common predetermined resolution, and a lens.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22.

A slider 25a of the 3D adjustment switch 25 is slidable to any position in a predetermined direction (along the longitudinal direction of the right side surface), and a display mode of the upper LCD 22 is determined in accordance with the position of the slider 25a. Further, a manner in which the stereoscopic image is visible is adjusted in accordance with the position of the slider 25a. Specifically, an amount of deviation in the horizontal direction between a position of an image for a right eye and a position of an image for a left eye is adjusted in accordance with the position of the slider 25a.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be configured to be lit up only when the upper LCD 22 is in the stereoscopic display mode and program processing for displaying a stereoscopic image is performed.

Further, a speaker hole 21E is provided on the inner side surface of the upper housing 21. A sound is outputted through the speaker hole 21E from a speaker 43 described below.

(Internal Configuration of Game Apparatus 10)

Next, an internal electrical configuration of the game apparatus 10 will be described with reference to FIG. 3. FIG. 3 is a block diagram illustrating an internal configuration of the game apparatus 10. As shown in FIG. 3, the game apparatus 10 includes, in addition to the components described above, electronic components such as an information processing section 31, a main memory 32, an external memory interface (external memory I/F) 33, an external data storage memory I/F 34, the internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a program stored in a memory (for example, the external memory 44 connected to the external memory I/F 33 or the internal data storage memory 35) inside the game apparatus 10, thereby performing processing corresponding to the program (e.g., photographing processing and below-described game processing). The program executed by the CPU 311 of the information processing section 31 may be obtained from another device through communication with the other device. The information processing section 31 further includes a VRAM (Video RAM) 313. The GPU 312 of the information processing section 31 generates an image in accordance with an instruction from the CPU 311, and renders the image in the VRAM 313. The GPU 312 outputs the image rendered in the VRAM 313, to the upper LCD 22 and/or the Tower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the processing based on the above program, and temporarily stores a program obtained from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect an orientation and a motion of the game apparatus 10.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 obtains the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 obtains the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the upper LCD 12 to display a stereoscopic image (stereoscopically visible image).

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye which are stored in the VRAM 313 of the information processing section 31 are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image of the real world in accordance with an instruction from the information processing section 31 and output image data of the real world to the information processing section 31. When a taken image is displayed in real time on the upper LCD 22 or the lower LCD 12 or when image processing such as color recognition or face recognition is performed, each of the outer imaging section 23 and the inner imaging section 24 is configured to take an image of the real world at predetermined time intervals and output the image date to the information processing section 31.

The 3D adjustment switch 25 is connected to the information processing section 31. The 3D adjustment switch 25 transmits, to the information processing section 31, an electrical signal in accordance with the position of the slider 25*a*.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode. The game apparatus 10 has the internal configuration as described above.

(Outline of Information Processing in Game Apparatus 10)

Hereinafter, an outline of information processing in the game apparatus 10 according to an exemplified embodiment will be described.

In the present embodiment, the information processing section 31 causes coordinates in a virtual space to correspond to absolute coordinates in the real world (e.g., coordinates in a marker coordinate system) on the basis of a visual marker 60 (hereinafter, referred to as marker 60). The information processing section 31 recognizes at least a part of an image including an image of the marker 60 by performing a feature extraction process on the image including the image of the marker 60. Then, the information processing section 31 sets a predetermined position in the recognized marker 60 as the origin of the marker coordinate system. Next, the information processing section 31 sets the virtual camera such that the virtual camera has the same position and orientation with respect to the marker 60, which is a reference, as those of the outer imaging section 23 that takes an image of the real world. Then, the information processing section 31 causes the properties (e.g., parameters such as lens distortion, focal length, and an angle of view) of the virtual camera to agree with those of the outer imaging section 23 as necessary. In this manner, the real world corresponding to the real world image including the marker 60 and the virtual space corresponding to the virtual world image are appropriately superimposed on each other.

It should be noted that the above feature extraction process is a process of extracting a feature for allowing an inputted image to be recognized. Examples of the feature of the image include a point, a line, and a region. The point, the line and the region have unique feature quantities. Examples of the feature quantity of the point include a coordinate, a brightness, and a color. Examples of the feature quantity of the line include a length, and a direction. Examples of the feature quantity of the region include a surface area and a texture (a pattern that regularly changes in brightness, color, and the like).

The information processing section 31 performs feature extraction on an input image, recognizes the image by using an obtained feature quantity, and obtains information associated with the marker 60. Specifically, the information processing section 31 performs an image recognition process on an input image including an image of a marker having a pattern drawn in monochrome or in color, thereby obtaining identification information corresponding to the drawn pattern. The information processing section 31 may perform template matching for obtaining a similarity between the input image and a previously-registered image, thereby obtaining identification information corresponding to the marker 60. Alternatively, the information processing section 31 may recognize a matrix of data cells drawn in the input image (e.g., a matrix code in which fine squares are arranged in a matrix as points representing 1 bit of white or black (two types, 0 and 1), thereby obtaining identification information corresponding to the marker 60.

An information processing program according to the present embodiment is provided so as to serve as a part of a game program 70. The information processing program may be present as a modularized program that is separable from the game program 70, or as an inseparable program that is integrated with the game program 70.

The basic process of the game program 70 has the following flow.

(1) The information processing section 31 obtains an image of the real world taken by the outer imaging section 23.

(2) The information processing section 31 performs image processing on the obtained image to detect the marker 60 and to recognize a pattern drawn in the marker 60.

(3) The information processing section 31 measures the position and the orientation of the marker 60 in a three-dimensional space by projective geometrical calculation from position information of the marker 60 in the taken image.

(4) The information processing section 31 generates an image in which a three-dimensional virtual object is synthesized, on the basis of the measured position information. When stereoscopic viewing is provided, the information processing section 31 generates an image that is processed such that the image is stereoscopically visible.

(5) The information processing section 31 displays the generated image on a predetermined display surface of the game apparatus 10. A novel characteristic in the exemplified embodiment relates particularly to the process (2) among the above processes (1) to (5).

Hereinafter, information processing performed on the basis of the game program 70 in the game apparatus 10 will be described in more detail with reference to mainly FIG. 4A and the subsequent drawings.

Figure 4A:
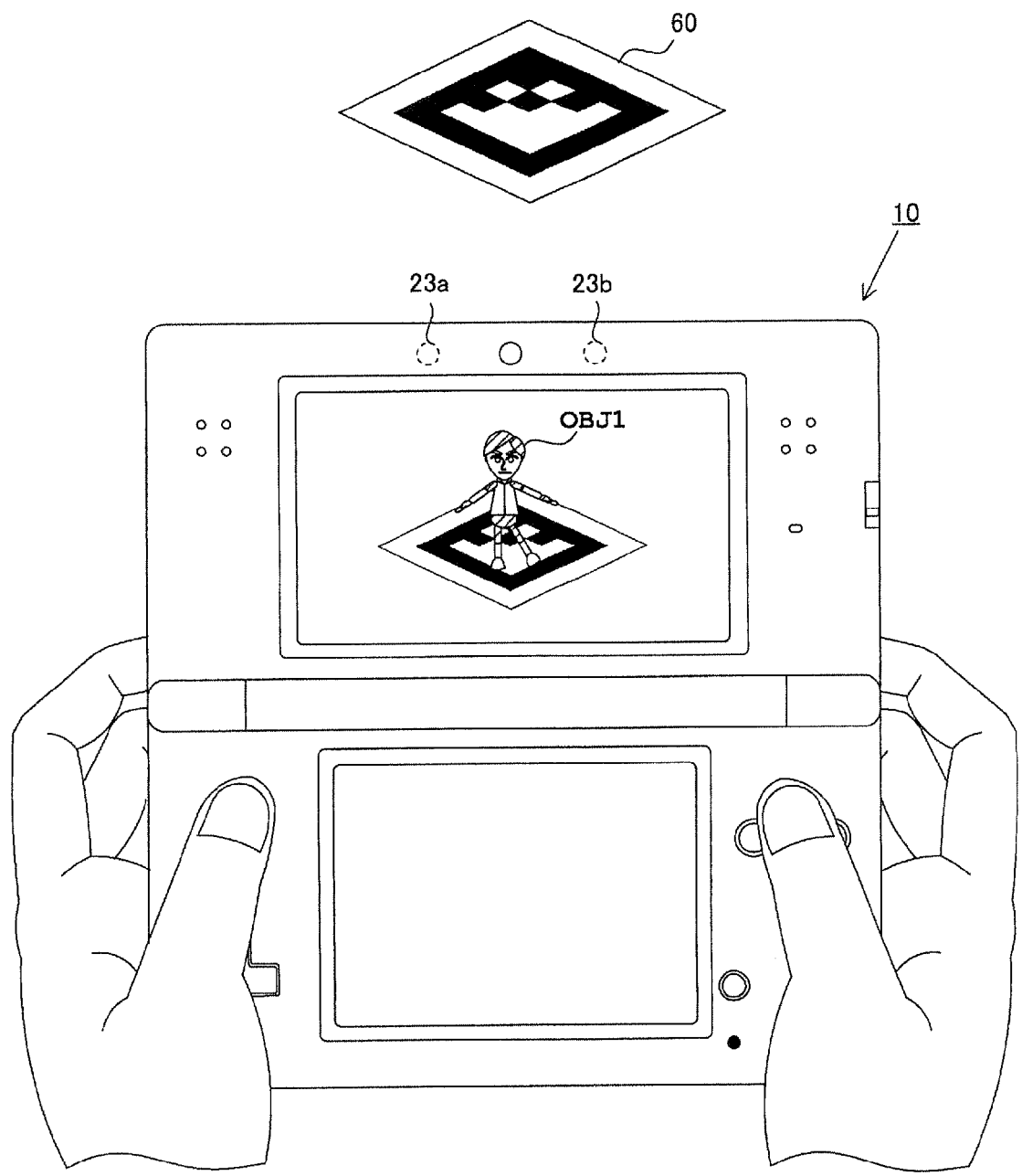
FIG. 4A is a diagram illustrating an example of an image displayed on a screen of an upper LCD 22 when an image of a marker 60 is taken by an outer imaging section 23.

FIG. 4A is a diagram illustrating an example of an image displayed on the screen of the upper LCD 22 when an image of the marker 60 is taken by the outer imaging section 23. The information processing section 31 performs image processing on an image (real world image) obtained from the outer imaging section 23. The information processing section 31 can determine whether or not the marker 60 is included in the real world image, on the basis of a result of the image processing. Here, the information processing section 31 defines a marker coordinate system (a coordinate system having an origin at a predetermined point in the virtual space corresponding to the position of the marker 60 in the real world) based on the recognized marker 60.

On the basis of the position and the orientation of the marker 60 and information calculated from the position and the like, the information processing section 31 displays a plurality of virtual objects (e.g., an object OBJ1) on the upper LCD 22 such that the virtual objects are stereoscopically visible. Here, the information processing section 31 appropriately combines the real world image and an image of the virtual space (a virtual world image) that is generated during the information processing. In order to extend/enhance perception information received from the real environment, the information processing section 31 appropriately superimposes a real space corresponding to the real world image including the marker 60 and a virtual space corresponding to the virtual world image, on each other.

Figure 4B:
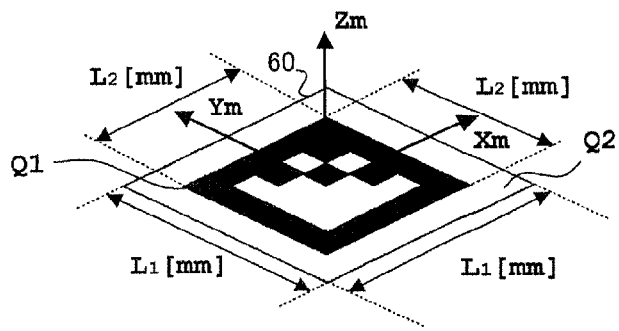
FIG. 4B is a schematic diagram illustrating an example of the marker 60 and an example of a marker coordinate system defined for the marker 60.

FIG. 4B is a schematic diagram illustrating an example of the marker 60 and an example of the marker coordinate system defined for the marker 60. In the exemplified embodiment, the marker 60 has a main surface with a square shape ($L_1$ [mm]×$L_1$ [mm]). Then, the marker 60 has a pattern (a black-and-white or full-color pattern) for recognition, which is drawn within a black thick frame (hereinafter, referred to as outer frame Q1) drawn on the main surface. The shape of the outer frame Q1 is a square ($L_2$ [mm]×$L_2$ [mm]) In addition, the outer frame Q1 is surrounded by a white thick frame (hereinafter, referred to as outermost frame Q2). It should be noted that the outermost frame Q2 is a region provided for accurately detecting the marker 60, but this region may not be provided. This is an example of the marker 60 that can be used in the embodiment of the present invention, but the one skilled in the art can make various modifications on the basis of the specific description of the present specification without departing from the principle of example embodiments of the present invention.

In this example, the origin O of the marker coordinate system is located at the center of the marker 60. In addition, a point in the marker coordinate system is represented as ($X_m$, $Y_m$, $Z_m$). As shown in FIG. 4B, the main surface of the marker corresponds to a plane $X_m$-$Y_m$ in the marker coordinate system. A $Z_m$ axis is a coordinate axis orthogonal to the plane. A virtual object (e.g., the virtual object OBJ1) is represented in the marker coordinate system. In order to display taken images of the virtual object and the real world such that the images are superimposed on each other, the information processing section 31 uses a coordinate system having an origin at a viewpoint of imaging, in this process.

The game apparatus 10 has a function of providing stereoscopic viewing to the user. In order to provide a stereoscopically visible image, the game apparatus 10 separately sets coordinate systems for both a right eye and a left eye as viewpoints in some cases. However, in the following, a description based on a "camera coordinate system" will be given for simplifying a description concerning the relative position of the marker 60 and a viewpoint from which an image of the real world including the marker 60 is taken. The "camera coordinate system" is a coordinate system having an origin at the viewpoint as a representative point. On the basis of the following description for the above camera coordinate system, the one skilled in the art will understand that a coordinate system that should be introduced for providing an image for a right eye and an image for a left eye that allow for stereoscopic viewing, and a coordinate transformation matrix based on this coordinate system are obtained by taking into consideration a binocular disparity that should be established between the image for a right eye and the image for a left eye.

Further, in reality, raw image data obtained from the outer imaging section 23 includes distortion due to the properties of its optical system (e.g., the properties of a lens) in some cases (e.g., barrel type distortion can occur when a wide-angle lens is used in the imaging section). As necessary, the information processing section 31 can remove such distortion and the like that depend on the properties of the optical system, by appropriately performing a coordinate transformation process using a distortion function and the like.

Hereinafter, an exemplified embodiment of the present invention will be described on the basis of the relationship between the marker coordinate system and the camera coordinate system.

Figure 4C:
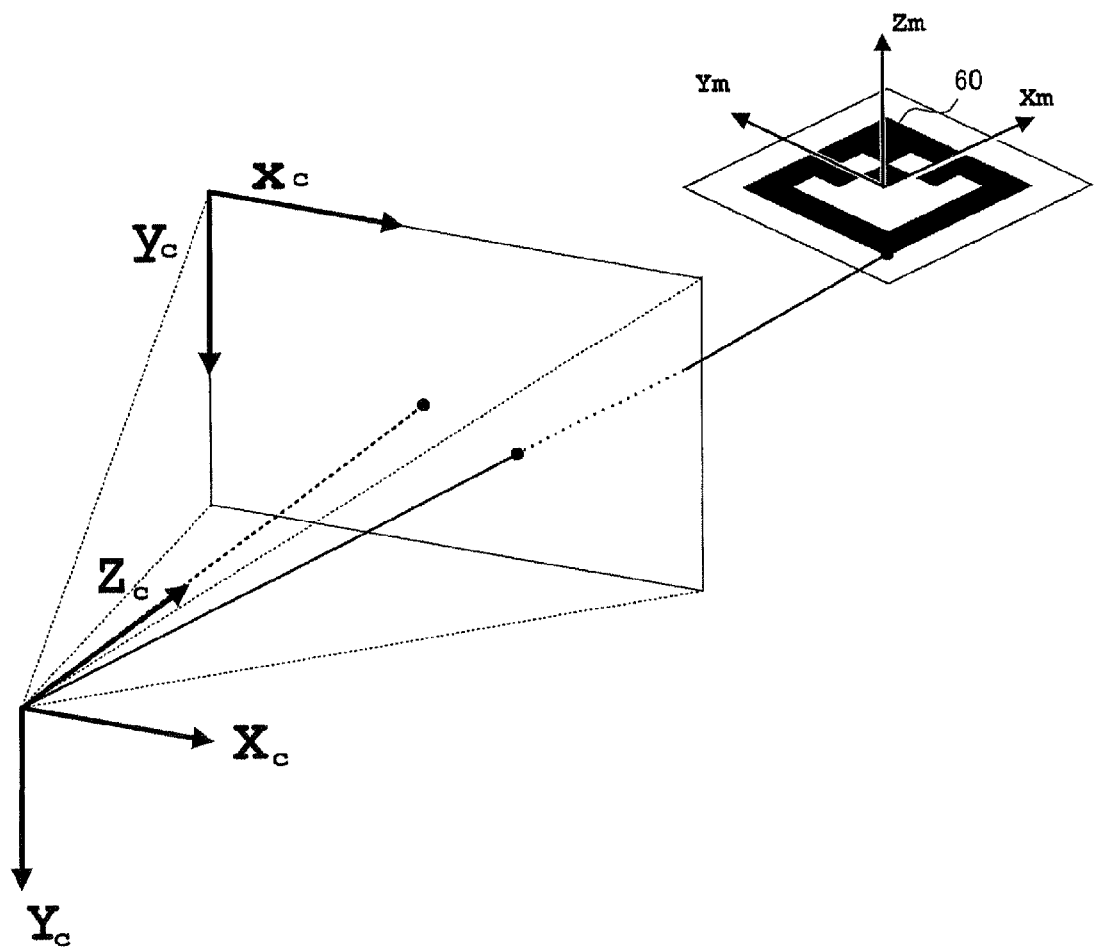
FIG. 4C is a schematic diagram illustrating a coordinate system involved in information processing of the game apparatus 10.

FIG. 4C is a schematic diagram illustrating a coordinate system involved in the information processing in the game apparatus 10.

In the camera coordinate system, the origin is set at the viewpoint, a $Z_c$ axis is set to have a direction perpendicular to the image plane, and an $X_c$ axis and a $Y_c$ axis are set to have directions parallel to an $x_c$ axis and a $y_c$ axis of an image plane projected by a perspective transformation mode, respectively. A point ($X_m$, $Y_m$, $Z_m$) represented in the marker coordinate system can be transformed into a point in the camera coordinate system by rotation/translation. A point in the camera coordinate system is represented as ($X_c$, $Y_c$, $Z_c$). In the present specification, the image plane projected by the perspective transformation model is referred to as screen coordinate system. A point ($X_c$, $Y_c$, $Z_c$) in the camera coordinate system is projected at a point ($x_c$, $y_c$) in the screen coordinate system.

Figure 4D:
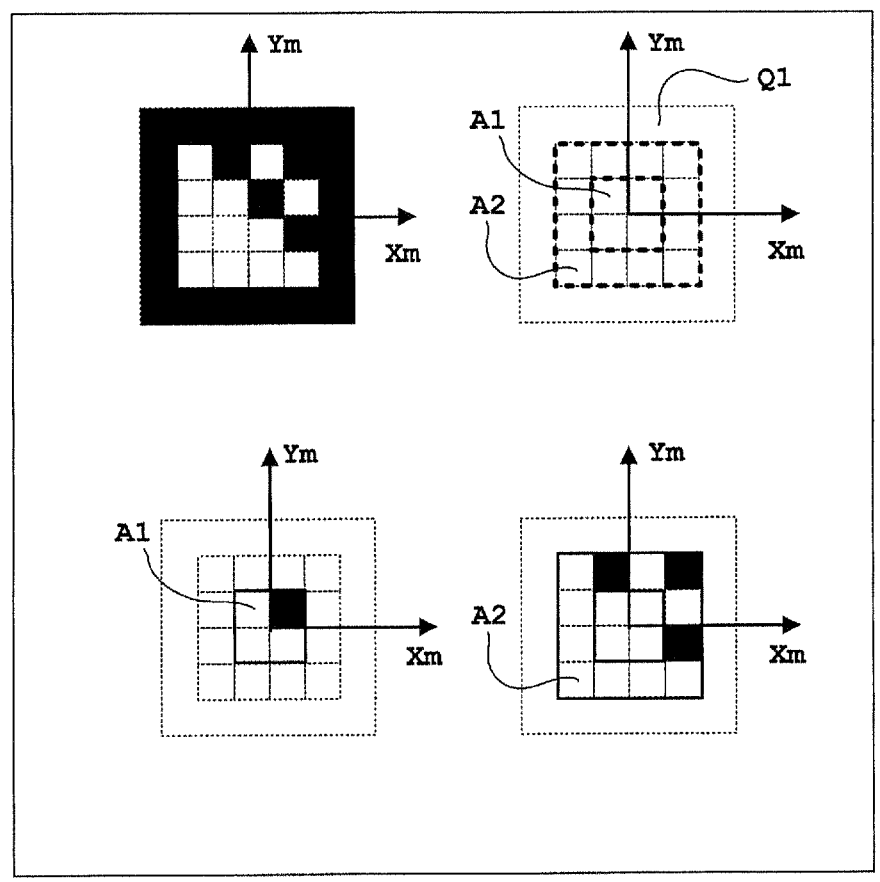
FIG. 4D is a schematic diagram illustrating an example of regions defined for a pattern of the marker 60.

FIG. 4D is a schematic diagram illustrating an example of regions defined for the pattern of the marker 60. FIG. 4E is a schematic diagram for illustrating a process of recognizing the example of the marker 60 shown in FIG. 4D, but its details will be described below. In FIGS. 4D and 4E, the outermost frame Q2 is omitted.

FIG. 4D illustrates an example of the pattern drawn on the main surface of the marker 60, on the upper left side. The marker 60 has the pattern for recognition within the outer frame Q1. In this example, a region (a recognition pattern region) of the marker 60 excluding the outer frame Q1 is handled per subregion obtained by dividing the region into 16 subregions in a lattice form (see the upper right side of FIG. 4D). In other words, each subregion is painted in white or black.

The information processing section 31 obtains an image of the real world from the outer imaging section 23. Next, the information processing section 31 transforms the obtained image (hereinafter, referred to as "camera image") into a binary image. Then, the information processing section 31 detects the marker 60 from the binary image and performs recognition of the pattern in the marker 60.

When detecting and recognizing the marker 60 from the binarized camera image, the information processing section 31 divides the region of a plane including the pattern of the marker 60, which is the recognition target, into a plurality of subregions, and handles the regions in a phased manner.

Specifically, when recognizing the marker 60, the information processing section 31 initially recognizes a pattern in a central region A1 of the marker 60. As shown on the upper right side of FIG. 4D, the recognition pattern region is divided, for example, into 16 unit regions in a lattice form, and is handled per unit region obtained by this division. It should be noted that dotted lines in the drawing are drawn for convenience of explanation and are not included in the actual marker 60. Further, the information processing section 31 has the collection of unit regions in the recognition pattern region that are treated-separately and divided into the following two groups: one group consisting of central four (2×2) unit regions (hereinafter, referred to as central region A1) and the other group consisting of 12 unit regions located around the central region A1 (hereinafter, referred to as outer region A2) central region.

In a process of recognizing the pattern in the recognition pattern region, the information processing section 31 initially performs a recognition process on the central region A1. Then, the information processing section 31 recognizes the outer region of the marker 60 depending on a recognition result of the central region A1. The information processing section 31 improves accuracy of recognition by recognizing the central region A1 and using the recognition result for recognizing another region.

A more specific recognition method will be described. For example, the information processing section 31 sets a threshold for a binarization process in marker detection, on the basis of values of pixels of the entire camera image (e.g., brightness values). Then, the information processing section 31 uses the threshold for recognition of the pattern (black-and-white pattern) belonging to the central region A1 of the marker. The information processing section 31 obtains information corresponding to the recognition result, as a bit string having a predetermined length (e.g., a four-bit length). Here, white and black are represented so as to correspond to "0" and "1", respectively.

Next, the information processing section 31 determines whether or not the obtained bit string is a predetermined combination (e.g., {1, 0, 0, 0} or {0, 1, 1, 1}). Then, when determining that the bit string constitutes the predetermined combination, the information processing section 31 proceeds to a process of determining a pattern in the remaining region (outer region A2). Since the information processing section 31 takes out only the central region A1 and initially recognizes the central region A1, the efficiency of recognition can be improved. Initially, the central region A1 in which pixels are unlikely to become individually and visually unrecognized when viewed in any direction is recognized. When the recognition fails, it may be in a state where the image quality of the outer region also does not meet a requirement for recognition. Therefore, since the central region A1 is initially recognized and then it is determined whether or not it is necessary to recognize the outer region depending on the recognition result of the central region A1, the processing can be proceeded without performing a wasteful process.

Further, the information processing section 31 sets a threshold for recognition of the remaining outer region, on the basis of pixel values of the central region A1. Then, the information processing section 31 performs a black/white determination on pixels belonging to the outer region, by using the new threshold. Since the threshold for recognition of the remaining outer region is set on the basis of the pixel values of the central region A1, a recognition process that is adaptable to change of the surrounding environment is implemented.

Then, the information processing section 31 obtains information consisting of a bit string having a predetermined length (e.g., information having a 9-bit length), only from a result of determining a pattern (black-and-white pattern) belonging to the outer region of the marker by using the threshold. It should be noted that the pattern in the outer region is previously provided with a region (e.g., a region for total three bits) corresponding to information that serves as information (parity bit) for error detection. By introducing error detection to the outer region, a recognition result with high accuracy is obtained also for the outer region in which pixels are likely to become individually and visually unrecognized.

(Details of Processing)

(One Example of Main Data Used in Processing)

First, main data that is stored in the main memory 32 during execution of the game program 70 will be described.

Figure 5:
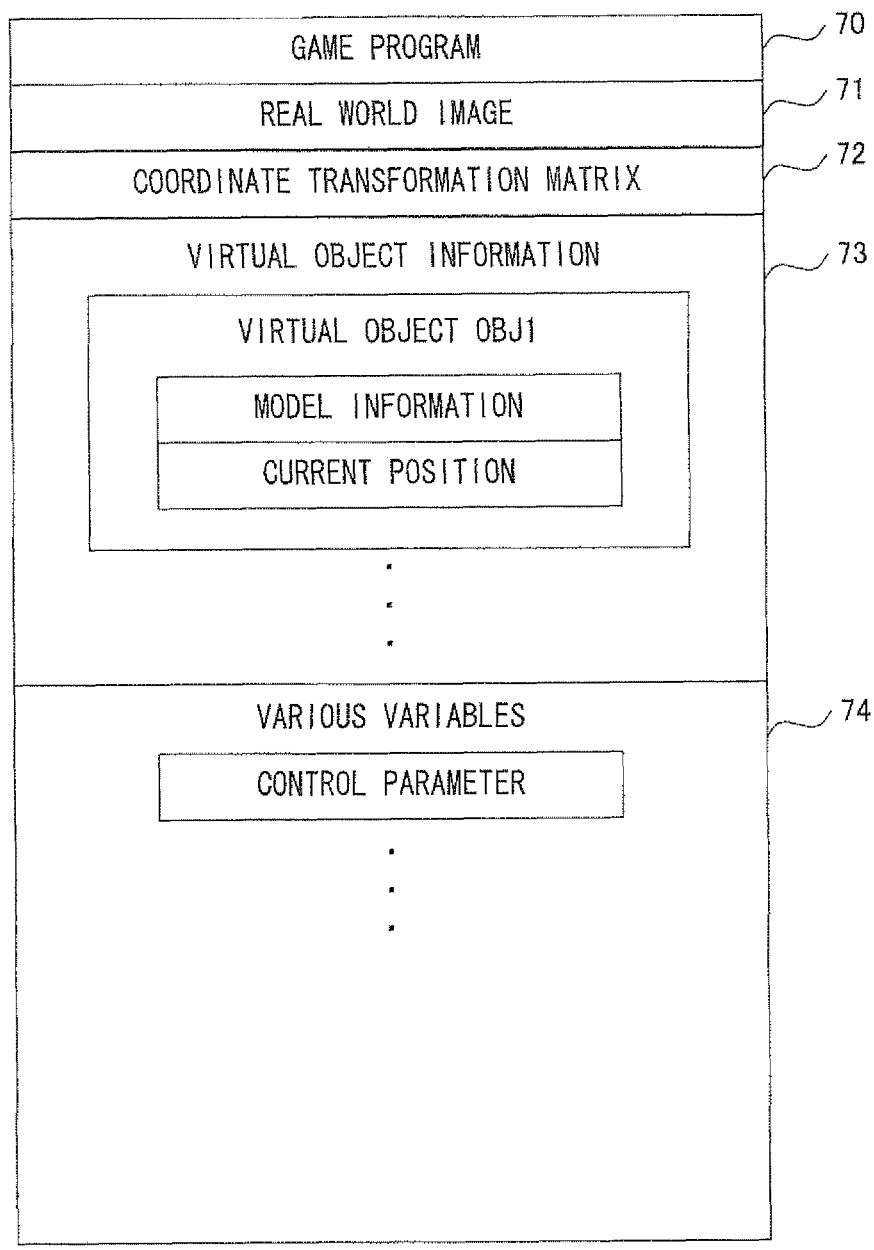
FIG. 5 is a diagram illustrating a memory map of a main memory 32 of the game apparatus 10.

FIG. 5 is a diagram illustrating a memory map of the main memory 32 of the game apparatus 10. As shown in FIG. 5, the game program 70, a real world image 71, a coordinate transformation matrix 72, a virtual object information 73, various variables 74, and the like are stored in the main memory 32. The various variables include parameters used for image processing on an image appearing during processing of the above information processing program, or temporary processing target data. Unless otherwise specified herein, each parameter is stored in the main memory 32 of the game apparatus 10 and can be reused. Alternatively, data indicating these parameters and the like may be stored in another storage area of the game apparatus 10 and may be reused by being read therefrom.

The game program 70 is a program for causing the information processing section 31 to perform information processing.

The real world image 71 is an image of the real world taken by the outer imaging section 23. The real world image 71 can be an image of the real world (a left real world image) taken by the outer imaging section (left) 23a and/or an image of the real world (a right real world image) taken by the outer imaging section (right) 23b.

The coordinate transformation matrix 72 is used when rendering a virtual object that is viewed from the virtual camera, and is a coordinate transformation matrix for transforming a coordinate represented in the marker coordinate system into a coordinate represented in a virtual camera coordinate system. When stereoscopic viewing is provided, under settings obtained by taking into consideration a binocular disparity occurring between an image for a left eye and an image for a right eye, the information processing section 31 sets a virtual camera coordinate system for a left eye, a virtual camera coordinate system for a right eye, and a coordinate transformation matrix, during the processing.

The virtual object information 73 is information on virtual objects and includes model information representing the shapes and patterns of the virtual objects, current positions of the virtual objects in the virtual space, and the like.

The various variables 74 are used when the game program 70 is executed.

When the game apparatus 10 is powered on, the information processing section 31 (the CPU 311) of the game apparatus 10 executes a boot program stored in a ROM (not shown), thereby initializing each unit such as the main memory 32. Next, the game program stored in the internal data storage memory 35 is loaded into the main memory 32, and execution of the game program is started by the information processing section 31.

Figure 6:
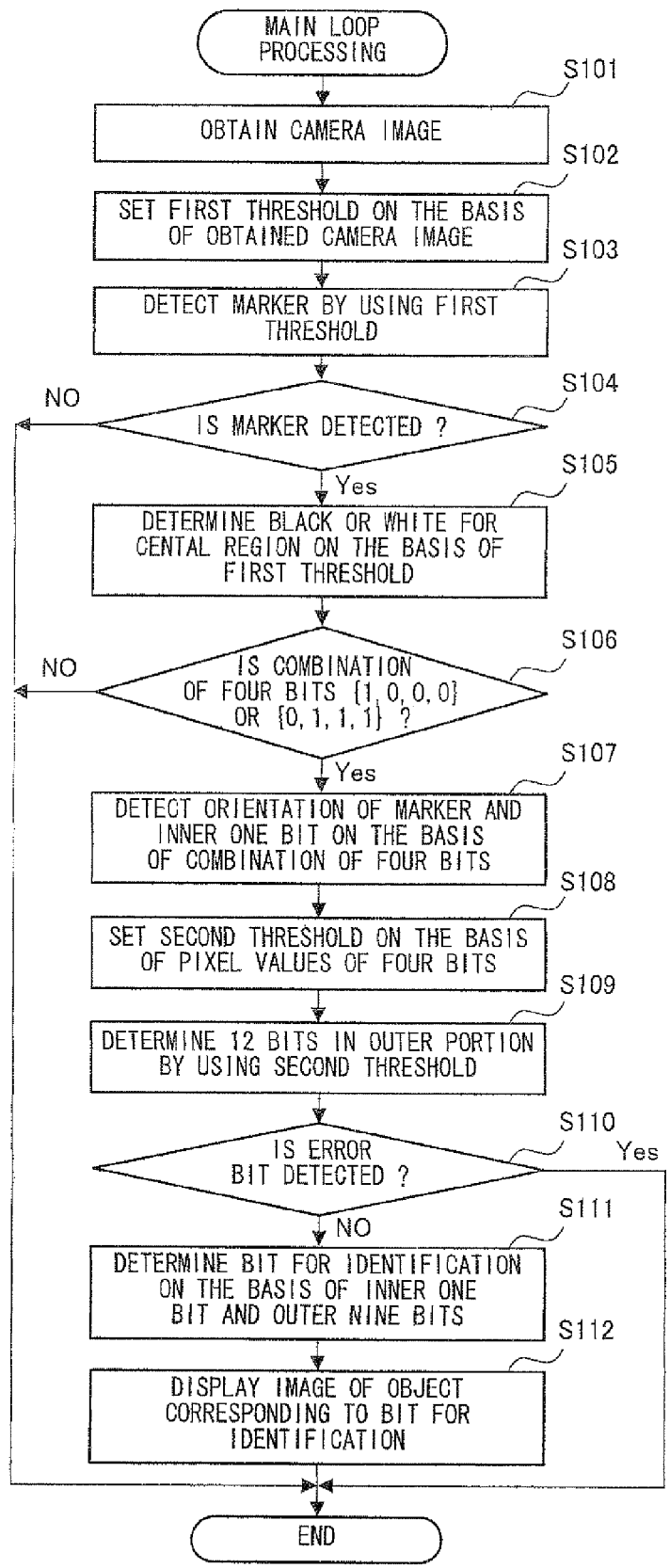
FIG. 6 is a flowchart illustrating an example of a series of processes (main loop processing), in an information processing program according to an exemplified embodiment, from reading of an input image through detection and recognition of the marker 60 to displaying of a virtual object and the input image in a superimposed manner.

Hereinafter, a flow of the processing performed on the basis of the information processing program according to the exemplified embodiment will be described with reference to a flowchart in FIG. 6. In FIG. 6, "step" is abbreviated as "S". It should be noted that the flowchart in FIG. 6 is merely one example. Therefore, the order of each process step may be changed as long as the same result is obtained. In addition, the introduced coordinate systems, the values of variables, and thresholds used at determination steps are also merely examples, and other coordinate systems and other values may be used as necessary. Moreover, in the present embodiment, the information processing section 31 (e.g., the CPU 311) performs processes at all steps in the flowchart in FIG. 6. However, a processor or a dedicated circuit other than the information processing section 31 may perform processes at some of the steps in the flowcharts in FIG. 6.

(Specific Example of Processing)

FIG. 6 is a flowchart illustrating an example of a series of processes (main loop processing), in the information processing program according to the exemplified embodiment, from reading of an input image through detection and recognition of the marker 60 to displaying of a virtual object and the input image in a superimposed manner.

The main loop processing is processing including obtaining an input image, image processing on the input image, and image display based on the processing result. A description concerning a process at start-up of attached hardware and a process of the information processing section 31 reading the game program 70 from a storage area of the game apparatus 10, is partially omitted for simplification. The frame rate of this application can be determined on the basis of settings including intervals of obtaining camera images. In addition, the outer imaging section 23 consecutively takes the images of the real world at predetermined obtaining intervals. The game program 70 obtains images of the real world taken consecutively at the predetermined obtaining intervals, and repeatedly performs the main loop processing with each image as an input image.

Hereinafter, each step in the main loop processing will be described.

At step 101, the information processing section 31 performs a process of obtaining a camera image. As described above, the information processing section 31 obtains a taken image of the real world as an input image, and proceeds to the next process.

Specifically, for example, the information processing section 31 obtains an image loaded as the real world image 71 into the storage area of the game apparatus 10, as a processing target (input image) in steps after this step.

At step 102, the information processing section 31 performs a process of setting a threshold (hereinafter, referred to as first threshold) for performing a binarization process on the obtained camera image, on the basis of the camera image.

Specifically, the information processing section 31 performs a process of setting a threshold for performing the binarization process on the obtained image, on the basis of a value that is previously set for each of all obtained camera images, or properties of the obtained camera image. Here, the binarization process is a process of obtaining a "binary image (an image whose gradation is represented with 1 bit)" from a "multivalued image (an image whose gradation is represented with 2 or more bits)". In the binarization process, each pixel of the multivalued image is transformed into white or black depending on whether the pixel is brighter or darker in density than a reference value (threshold). The multivalued image may be a gray scale image or a color image. Further, the first threshold may be a predetermined fixed value or may be a threshold calculated with the obtained camera image as an input.

When the first threshold is set on the basis of the previously provided values, the following value can be used. For example, when the brightness of each pixel is a value in the range of 0 to 255, a value handled as a threshold by the information processing section 31 may be previously set, for example, to a value in the range of 100 to 130 (e.g., 128).

On the other hand, at the time of loading the input image, the information processing section 31 may set the first threshold on the basis of the properties of the obtained camera image. Examples of the method of the information processing section 31 setting the first threshold on the basis of the input image include, but are not limited to, a mode method, a P-tile method, and a differential histogram method. In the mode method, when the density histogram of the input image has a valley, the density at the point of the valley is set as a threshold. In the differential histogram method, a maximum point in the differential histogram of a target pixel in the input image is set as a threshold.

It should be noted that on the assumption of performing a process based on a dynamic threshold method as a method of binarizing the entirety of the input image, the information processing section 31 may set a threshold for performing the process, as the first threshold. In other words, the information processing section 31 can perform binarization by comparing the shade level of a pixel that is a processing target to the local average of neighboring pixels (4-neighbours or 8-neighbours). In this case, the local average serves as the first threshold.

Further, the information processing section 31 may be configured to have the first threshold represented by a previously-set fixed value; and to newly set a value for the first threshold only when the marker detection fails at step 103 and the subsequent steps in the flowchart. In this case, specifically, the information processing section 31 performs edge detection, and can set a threshold on the basis of change of brightness at an edge portion. The edge portion refers to pixels of which a change in brightness is equal to or higher than a certain amount. In reality, the information processing section 31 samples a plurality of such pixels, and can obtain the first threshold by obtaining the (weighted) average of the sampled pixels.

At step 103, the information processing section 31 performs a process of detecting the marker 60, by using the first threshold. An example of the process of detecting the marker 60, which is performed by the information processing section 31 at this step, will be described.

Specifically, first, the information processing section 31 binarizes the input image on the basis of the first threshold obtained at step 102. Next, the information processing section 31 performs labeling (assigning of identification information) on each connected component of black pixels in the binarized image (black-and-white image). As a result of the process, the outer frame Q1 of the marker 60 is included in any of the labeled connected components. The information processing section 31 removes regions in which there is a low possibility that the marker 60 is included, by taking into consideration the size and the aspect ratio of the circumscribed quadrangle of each connected component.

Giving a more specific description, for example, the information processing section 31 can remove massive regions and micro regions by evaluating the surface area values of each connected component (e.g., the number of pixels). In addition, the information processing section 31 can remove connected components that contact an image boundary, on the basis of information of the circumscribed quadrangles.

Next, the information processing section 31 performs contour line tracking on the remaining connected components, and stores all the positions of pixels located on a contour line. In addition, the information processing section 31 performs broken line approximation on contour line data and sets, as a candidate for the marker, a connected component that can be approximated with sufficient accuracy by four line segments.

Further, the information processing section 31 stores coordinate values corresponding to four broken points at that time.

It should be noted that a predetermined pattern (design) is drawn in the recognition pattern region of the marker 60. The information processing section 31 recognizes at least a part of an image including an image of the marker 60 by performing a process of extracting a feature corresponding to at least a part of the predetermined pattern from the image including the image of the marker 60. During the process of recognizing the marker 60, the information processing section 31 performs a process of normalizing the image. The marker 60 is projected on the screen coordinate system by the perspective transformation model, and thus the information processing section 31 transforms a point (Xm, Ym, 0) in the plane Xm-Ym in the marker coordinate system into a point (xc, yc) in the screen coordinate system by the following equation.

[Mathematical Equation 1]

$$h\begin{bmatrix} x_c \\ y_c \\ 1 \end{bmatrix} = \begin{bmatrix} C_{11} & C_{12} & C_{13} \\ C_{21} & C_{22} & C_{23} \\ C_{31} & C_{32} & C_{33} \end{bmatrix}\begin{bmatrix} X_m \\ Y_m \\ 1 \end{bmatrix} \quad (Eq.\ 1)$$

The information processing section 31 previously knows the size of the marker 60, and thus can calculate values of all $C_{ij}$ (i=1 to 3, j=1 to 3) in this equation by using size information of the marker 60 and the coordinates of four vertices approximately detected when the broken line approximation is performed. Here, h is a scalar. The information processing section 31 can normalize the inner pattern of the marker 60 by the above equation.

Next, the information processing section 31 performs line fitting on contour line data corresponding to each side of the marker 60, by a least-squares method, and sets intersections of these straight lines as vertex coordinates. It should be noted that in the processing performed so far, when performing the line fitting, the information processing section 31 performs transformation with a distortion function as necessary, to calculate vertex coordinates in the screen coordinate system.

The four vertex coordinates obtained thus are used by the information processing section 31 for calculating three-dimensional position information of the marker 60. Specifically, the calculation of the three-dimensional position information of the marker 60 is a process of obtaining a coordinate transformation matrix ($T_{cm}$) for transformation from the marker coordinate system into the camera coordinate system.

Hereinafter, the calculation of the three-dimensional position information of the marker 60 will be described.

The coordinate transformation matrix consists of a rotation component $R_{3\times3}$ and a translation component $T_{3\times1}$. In general, transformation between the screen coordinate system and the camera coordinate system can be performed by a perspective transformation model. The relation between these coordinate systems can be represented, for example, by the following equation.

[Mathematical Equation 2]

$$\begin{bmatrix} X_c \\ Y_c \\ Z_c \\ 1 \end{bmatrix} = T_m \begin{bmatrix} X_m \\ Y_m \\ Z_m \\ 1 \end{bmatrix} = \begin{bmatrix} R_{3\times3} & T_{3\times1} \\ 0\ 0\ 0 & 1 \end{bmatrix}\begin{bmatrix} X_m \\ Y_m \\ Z_m \\ 1 \end{bmatrix} = \begin{bmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{bmatrix}\begin{bmatrix} X_m \\ Y_m \\ Z_m \\ 1 \end{bmatrix} \quad (Eq.\ 2)$$

$$\begin{bmatrix} hx_c \\ hy_c \\ h \\ 1 \end{bmatrix} = P\begin{bmatrix} X_c \\ Y_c \\ Z_c \\ 1 \end{bmatrix} = \begin{bmatrix} P_{11} & P_{12} & P_{13} & 0 \\ 0 & P_{22} & P_{23} & 0 \\ 0 & 0 & 1 & 0 \\ 0 & 0 & 0 & 1 \end{bmatrix}\begin{bmatrix} X_c \\ Y_c \\ Z_c \\ 1 \end{bmatrix} \quad (Eq.\ 3)$$

Here, a matrix P is a matrix representing projective transformation from the camera coordinate system into the screen coordinate system where the screen coordinate system is defined as $[x_c, y_c, 1]^T$. In addition, h is a scalar. Further, the matrix P is previously obtained by a calibration process for reflecting the properties of an imaging section (e.g., the outer imaging section 23) for obtaining an image.

As described above, the coordinates of the four vertices of the marker 60 in the marker coordinate system are set by using the position of the origin and information of the length ($L_1$ [mm] and $L_2$ [mm]) of each side of the marker 60. The corresponding relation between the marker coordinate system and the screen coordinate system can also be recognized as described above. Thus, on the basis of these pieces of information, the information processing section 31 calculates the above transformation matrix $T_{cm}$.

Specifically, the information processing section 31 obtains the transformation matrix $T_{cm}$ by performing (1) estimation of the rotation component $R_{3\times3}$ and (2) estimation of the translation component $T_{3\times1}$. In this manner, the information processing section 31 can obtain the three-dimensional position information of the marker 60 by using the transformation matrix $T_{cm}$.

At step 104, the information processing section 31 performs a process of determining whether or not the marker 60 is detected. In other words, the information processing section 31 determines whether or not the marker 60 is detected as a result of a series of processes for marker detection performed at step 103. When the marker 60 is detected (Yes at step 104), the information processing section 31 proceeds to a process at step 105.

At step 105, the information processing section 31 determines black (1) or white (0) as an attribute of each of the four unit regions belonging to the central region A1, by using the first threshold and on the basis of pixel values (brightness values) obtained from the four unit regions. Then, the information processing section 31 obtains a bit string of four bits obtained as a result of the determination. For the convenience sake, a value "1" is assigned to a result of determination as black, and a value "0" is assigned to a result of determination as white. However, this assigning method is merely one example, and reverse assignment may be performed. Specifically, a value "0" may be assigned to a result of determination as black, and a value "1" may be assigned to a result of determination as white.

Specifically, the information processing section 31 identifies the positions of pixels (hereinafter, referred to as sampling points) within a range corresponding to the central region A1, from the positions of the four vertices of the marker 60. Then, the information processing section 31 determines an attribute (black/white) at each sampling point by comparing the brightness of the pixel at each identified sampling point to the first threshold. Specifically, the information processing section 31 determines a point having a brightness value lower than the first threshold, as being black (1). On the other hand, the information processing section 31 determines a point having a brightness value equal to or higher than the first threshold, as being white (0). Further, the information processing section 31 performs a determination of an attribute (black/white) of each of the unit regions belonging to the central region A1, on the basis of a result of the attribute determination for the sampling points. Here, the information processing section 31 may evaluate the result of the attribute determination for the sampling points such that the result is weighted in a manner dependent on a relative position within the unit regions in which the sampling points are located. For example, with respect to the evaluation based on the attributes at the sampling points, the information processing section 31 performs evaluation with weighting such that importance is placed on the attribute at a sampling point located at the center of each unit region. It suffices that the number of the sampling points is a certain number per unit region (e.g., nine points or four points).

In this manner, the information processing section 31 determines black (1) or white (0) for each of the unit regions belonging to the central region A1, and can obtain a combination of black (1)/white (0) determination results of the unit regions belonging to the central region A1. In other words, the information processing section 31 obtains information of four bits from the four unit regions of the central region A1.

At step 106, the information processing section 31 determines whether the bit string (four bits) obtained as a result of the determination is $\{1, 0, 0, 0\}$ or $\{0, 1, 1, 1\}$. $\{1, 0, 0, 0\}$ or $\{0, 1, 1, 1\}$ represents a combination of its elements. In other words, the appearing order of these elements does not need to be taken into consideration. When the combination of four bits obtained at step 105 is $\{1, 0, 0, 0\}$ or $\{0, 1, 1, 1\}$ (Yes at step 106), the information processing section 31 advances the processing to step 107. On the other hand, when the combination of four bits obtained at step 105 is neither $\{1, 0, 0, 0\}$ nor $\{0, 1, 1, 1\}$ No at step 106), the information processing section 31 ends the main loop processing.

At step 107, the information processing section 31 performs a process of detecting the orientation of the marker 60 and a representative bit (hereinafter, referred to as inner one bit) assigned as a result of the determination of the central region A1, on the basis of the combination of four bits.

For example, the information processing section 31 can determine the orientation of the marker 60 as follows. When the combination of four bits is $\{1, 0, 0, 0\}$, the information processing section 31 can determine the orientation of the marker 60 on the basis of the position of the unit region of black (1) in the central region A1.

A specific example will be described with reference to FIG. 4E. FIG. 4E is a schematic diagram illustrating an example of the pattern drawn in the recognition pattern region of the marker 60. In the leftmost column of the FIG. 4E, four markers 60 are shown. The four markers 60 ((1-1) to (4-1)) are shown by rotating the same marker sequentially clockwise by 90 degree steps in order from the topmost side toward the bottommost side. In the second column from the left, only the recognition pattern regions of the markers 60 in the leftmost column are shown ((1-2) to (4-2)). In the third column from the left, only the central regions A1 of the markers 60 in the leftmost column are shown ((1-3) to (4-3)). Here, for the convenience sake, 0 and 1 is shown for white and black, respectively. It should be noted that for reference, in the rightmost column, only the outer regions A2 of the markers 60 in the leftmost column are shown ((1-4) to (4-4)).

As understood from the third column from the left, when the combination of four bits is $\{1, 0, 0, 0\}$, for example, if a starting point to read the black/white determination result of the central region A1 (e.g., the upper right position in FIG. 4E) and its order (e.g., the clockwise direction from the starting point) are previously set, the information processing section 31 can easily determine to which of the above (1-1) to (4-1) the orientation of the marker 60 corresponds.

Similarly, when the combination of four bits that is the determination result is $\{0, 1, 1, 1\}$, the information processing section 31 can determine the orientation of the marker 60 on the basis of the position of white (0) in the central region A1 (2×2 region). In other words, the same method used when the combination of four bits is $\{1, 0, 0, 0\}$ can be applied to this case.

It should be noted that, for example, in order to deal with rotation of the marker 60, four templates of the marker 60 that are rotated from each other by 90 degree steps are previously created, similarities between these templates and the input image are calculated, and the template with the maximum similarity can be regarded as indicating the orientation of the marker 60.

For example, the determination of the inner one bit can be performed as follows. When the combination of four bits is $\{1, 0, 0, 0\}$, the information processing section 31 can assign 1 as an attribute of the inner one bit. On the other hand, when the combination of four bits is $\{0, 1, 1, 1\}$, the information processing section 31 can assign zero (0) as an attribute of the inner one bit.

In this manner, the information processing section 31 can obtain the orientation of the marker 60 and information of the inner one bit on the basis of the combination information of four bits of the central region A1.

At step 108, the information processing section 31 performs a process of setting a second threshold on the basis of the pixel values of four bits.

Specifically, the information processing section 31 sets the second threshold used for determining white (0) or black (1) for "12 bits in the outer portion", on the basis of the pixel values (brightness values) of the pixels belonging to the central region A1. In a specific method of calculating the second threshold, for example, the average of the brightness values of pixels that are determined as white and the brightness values of pixels that are determined as black in the central region A1 can be set as the second threshold. In this case, the black/white determination of the unit regions can be performed such that the weight of a center portion of each unit region is increased.

More specifically, at step 108, for example, the information processing section 31 calculates the second threshold as follows. Here, for the purpose of exemplification, the case will be described where the brightness values of the pixels of the input image are in the range of 0 to 255 and the first threshold is 128.

As described above, the information processing section 31 calculates the weighted average of a plurality of brightness values of pixels that are sampled from each of the four unit regions in the central region A1 (step 105). As a result of this process, the weighted average of each unit region is obtained as a representative value of the unit region. In other words, the information processing section 31 obtains, for example, {22, 204, 198, 210} as a combination of brightness values corresponding to the four unit regions in the central region A1.

Then, the information processing section 31 performs a determination process of comparing each element in the combination of brightness values (i.e., 22, 204, 198, and 210) to the first threshold (128). Here, when each element (the brightness value of each unit region) is equal to or higher than the first threshold (128), the information processing section 31 provides a value "1" as a determination result for the element. On the other hand, when each element is lower than the first threshold, the information processing section 31 provides a value "0" as a determination result for the element.

As a result of the determination process, the information processing section 31 obtains information of four bites corresponding to the four unit regions (a combination of four elements). In the example described above, the information processing section 31 obtains {0, 1, 1, 1}. The average of the brightness value corresponding to the element determined as 0 in the above determination process is 22 (22/1=22). Meanwhile, the average of the brightness values corresponding to the elements determined as 1 in the above determination process is 204 ((204+198+210)/3=204). The average of these two averages is 113 ((22+204)/2=113). For example, the information processing section 31 can set this average (113) as the second threshold.

Next, the case where the entirety of the input image is darker will be described as another example. Examples of the case where the entirety of the input image is darker includes the case where the combination of brightness values of the four unit regions in the central region A1 is {10, 151, 142, 145}. In the case and when the first threshold is 128, the information processing section 31 obtains {0, 1, 1, 1} as information of four bits corresponding to the four unit regions in the central region A1. Then, the information processing section 31 can set 78 as the second threshold at this time.

Further, the case where the entirety of the input image is brighter will be described as still another example. Examples of the case where the entirety of the input image is brighter includes the case where the combination of brightness values of the four unit regions in the central region A1 is {82, 232, 224, 228}. In the case and when the first threshold is 128, the information processing section 31 obtains {0, 1, 1, 1} as information of four bits corresponding to the four unit regions in the central region A1. Then, the information processing section 31 can set 155 as the second threshold at this time.

As described above, the second threshold depends on the state of the central region A1 in the input image.

At step 109, the information processing section 31 performs a process of determining the 12 bits in the outer portion by using the second threshold. Similarly to step 105, the information processing section 31 performs a determination of black (1)/white (0) on the 12 unit regions in the outer portion.

At step 110, the information processing section 31 performs a process of detecting an error bit.

Specifically, for example, the information processing section 31 divides the 12 unit regions belonging to the outer portion into three groups, and handles four unit regions as one group (hereinafter, referred to as "block"). Within one block, one unit region serves as a region for error detection. The information processing section 31 obtains a bit string having a 4-bit length, on the basis of a result of the above black/white determination of the block. Then, a bit corresponding to the region for error detection serves as a parity bit. In other words, the bit string having a 4-bit length consists of a bit string having a 3-bit length, which is a recognition target, and a parity bit of 1 bit.

The unit region for error detection of the marker 60 is previously created such that when the number of "1" of bits within a group of the other unit regions in the block is an odd number, the unit region for error detection is in a state corresponding to "0" (white in the example described above). In addition, the unit region for error detection of the marker 60 is previously created such that when the number of "1" of bits within the group of the other unit regions in the block is an even number, the unit region for error detection is in a state corresponding to "1" (black in the example described above).

Then, at step 110, the information processing section 31 determines whether or not reading of the pattern in the outer portion includes an error, on the basis of matching between the number of "1" included in the bit string having a 3-bit length, which is the recognition target, and the parity bit corresponding to the region for error detection.

Specifically, at step 110, when the sum of the numbers of "1" in the blocks is an odd number, the information processing section 31 determines that there is no error bit (No at step 110), and proceeds to a step at step 111. On the other hand, when the sum of the numbers of "1" in the blocks is an even number, the information processing section 31 determines that there is an error bit (Yes at step 110), and ends the main loop processing.

At step 111, the information processing section 31 performs a process of determining a bit string for identification on the basis of a combination of: the inner one bit obtained as a result of the determination of the central region A1; and nine bits (hereinafter, referred to as "outer nine bits") among the 12 bits in the outer portion (excluding the parity bits).

Specifically, for example, on the basis of a bit string (hereinafter, referred to as bit string for identification) having a 10-bit length, which is obtained by combining one bit obtained as the "inner one bit" and nine bits obtained as the "outer nine bits", the information processing section 31 selects an object previously caused to correspond to the bit string for identification (e.g., an image corresponding to the virtual object OBJ1) as a display object. Then, the information processing section 31 advances the processing to step 112. Since information on the orientation of the marker 60 is also used through the inner one bit, the orientation of the object may be caused to correspond to the inner one bit. It should be noted that in the present embodiment, the bit string of 10 bits, which is the combination of the inner one bit and the outer nine bits, is caused to serve as the bit string for identification and to correspond to the object. However, according to need, for example, only the outer nine bits may be caused to serve as bits for identification corresponding to the object.

At step 112, the information processing section 31 displays an image of the object corresponding to the bit string for identification, and ends the main loop processing. It should be noted that after the end of the main loop processing, the information processing section 31 performs the main loop processing on a new input image as necessary on the basis of other settings (e.g., a frame rate for the input image) and the like. The information processing section 31 can continuously and/or in real time provide displaying of the virtual object and the real world image in a superimposed manner, by sequentially and continuously loading an input image and performing the main loop processing.

(One Example of Effects Provided by Exemplified Embodiment)

(1) Since two-stage reading of the marker 60 is implemented, a system is provided which maintains excellent accuracy of recognizing the marker 60 while reducing the load of the process of recognizing the marker 60. With respect to the load of the process, even when a part of an image of the design region taken by the imaging section is not recognized or is recognized so as to include an error, the process load is reduced since it is not necessary to initially perform image recognition on the entirety of the design region. In the two-stage reading of the marker 60, initially recognizing the central region A1, in which the pixels are unlikely to become unclear when viewed in any direction, can provide recognition with higher reliability without requiring a recognition condition that is as server as that for the outer region A2.

(2) Since the first threshold for recognizing the central region A1 is calculated from the pixel values of the entity of the image, the recognition process is adaptable to change of the surrounding environment. Therefore, a more stable recognition result than that in the conventional art can be achieved.

(3) The first threshold used for detecting the identification information in the first region can be used also for detection of the marker 60.

(4) Since the recognition is separated into two stages and the process for error detection is added only to the recognition of the outer region located around the central region, the surrounding outer region, in which the pixels are likely to become individually and visually unrecognized, can be recognized with high accuracy without increasing the process load.

(Modifications etc.)

In another embodiment, the information processing section 31 may detect (obtain) information of both the central region A1 and the outer region A2, and when the information obtained from the central region A1 meets a predetermined condition, the information processing section 31 may perform predetermined information processing by using the information obtained from the central region A1 and the outer region A2. In such a configuration, in another embodiment, the information processing section 31 may perform predetermined information processing by using only the information obtained from the outer region A2. Further, when performing the predetermined information processing by using only the information obtained from the outer region A2, the information processing section 31 may determine whether or not the identification information obtained from the central region A1 agrees with predetermined identification information, or may determine whether or not a pattern of an image obtained from the central region A1 agrees with a predetermined pattern of an image.

In the embodiments described above, the stereoscopic image is displayed on the upper LCD 22 on the basis of the real world image taken in real time by the outer imaging section 23. However, in another embodiment, a stereoscopic image may be displayed on the upper LCD 22 on the basis of data of a moving image previously taken by the outer imaging section 23, an external stereo camera, or the like.

In the embodiments described above, the outer imaging section 23 is previously mounted to the game apparatus 10. However, in another embodiment, an external camera detachable from the game apparatus 10 may be used.

In the embodiments described above, the upper LCD 22 is previously mounted to the game apparatus 10. However, in another embodiment, an external stereoscopic display detachable from the game apparatus 10 may be used.

In the embodiments described above, the virtual objects are synthesized with the real world image and displayed by using the game apparatus 10. However, in another embodiment, the virtual objects may be synthesized with the real world image and displayed by using any information processing apparatus or information processing system (e.g., a PDA (Personal Digital Assistant), a mobile phone, a personal computer, or a camera).

In the embodiments described above, the information processing is executed by using only one apparatus (the game apparatus 10). However, in another embodiment, a plurality of information processing apparatuses, included in an image display system, that can communicate with each other may share the execution of the information processing.

It should be noted that in the case where the information processing program and the like of example embodiments of the present invention are used on a general-purpose platform, the information processing program may be provided under the condition that a standard program module provided on the platform is used. It should be understood that even if a function corresponding to such a module as described above is excluded from the information processing program, the resultant information processing program substantially corresponds to the original information processing program as long as the module complements the excluded function.

In the embodiments described above, a video see-through technique has been described in which a camera image taken by the outer imaging section 23 and virtual objects (e.g., the object OBJ1) are superimposed on each other and displayed on the upper LCD 22. However, the present invention is not limited thereto. For example, an optical see-through technique may be implemented.

In the optical see-through technique, a display device that includes at least an imaging section and that is worn at the head of the user (hereinafter, referred to as head mounted display) is used. The user wearing the head mounted display can view the real world through a display section (screen) located at a position corresponding to a lens part of eye glasses. The display section is formed from a material that allows the user to view the real world therethrough. In addition, the display section allows an image of a virtual object generated by a computer to be displayed thereon. Further, the display section includes a liquid crystal display device or the like, and is configured to display an image of a virtual object generated by a computer, on the liquid crystal display device or the like and guide light from the liquid crystal display device to the user's retina (by reflecting the light by a half mirror or the like). Thus, the user can view an image in which the image of the virtual object is optically superimposed on the real world. A camera included in the head mounted display is used for detecting the marker 60 located in the real world. Further, as another optical see-through technique, there is a technique in which a half mirror is not used and a transmissive liquid crystal display device is laminated on the display section. Example embodiments of the present invention may use this technique. In this case, when an image of a virtual object is displayed on the transmissive liquid crystal display device, the image of the virtual object displayed on the transmissive liquid crystal display device is superimposed on the real world viewed through the display section, and the image of the virtual object and the real world are viewed by the user.

While example embodiments of the invention have been described in detail, the foregoing description is in all aspects illustrative and not restrictive. It is understood that numerous other modifications and variations can be devised without departing from the scope of the invention. It should be understood that the scope of example embodiments of the present invention is interpreted only by the scope of the claims. It is also understood that, from the description of specific embodiments of the present invention, the one skilled in the art can easily implement example embodiments of the present invention in the equivalent range based on the description of example embodiments of the present invention and on the common technological knowledge. Further, it should be understood that terms used in the present specification have meanings generally used in the art concerned unless otherwise specified. Therefore, unless otherwise defined, all the jargon and technical terms have the same meanings as those generally understood by one skilled in the art of example embodiments of the present invention. In the event of any conflict, the present specification (including meanings defined herein) has priority.

What is claimed is:

1. A non-transitory computer-readable storage medium having stored therein an information processing program that causes a computer of an information processing apparatus to provide operation comprising:
   an image obtainment for sequentially obtaining an image;
   a specific object detection for detecting a specific object from the image obtained by the image obtainment;
   a first region information detection for detecting, on the basis of a first threshold and a pixel value obtained from a first region of the specific object detected by the specific object detection, first region information on the first region;
   a calculation for calculating a second threshold on the basis of the pixel value obtained from the first region when the first region information is detected by the first region information detection;
   a second region information detection for detecting, on the basis of the second threshold calculated by the calculation and a pixel value obtained from a second region of the specific object detected by the specific object detection which second region is different from the first region, second region information on the second region; and
   an output for outputting at least the second region information detected by the second region information detection.

2. The non-transitory computer-readable storage medium according to claim 1, wherein
   the first region is a center region of the specific object; and
   the second region is a region surrounding the central region.

3. The non-transitory computer-readable storage medium according to claim 1, wherein
   the information processing program further causes the computer to provide further operation comprising a first threshold calculation for calculating the first threshold on the basis of pixel values of the image obtained by the image obtainment;
   the first region information detection detects the first region information on the basis of the pixel value obtained from the first region and the first threshold calculated by the first threshold calculation.

4. The non-transitory computer-readable storage medium according to claim 1, wherein the specific object detection detects the specific object on the basis of the first threshold and pixel values obtained from the image obtained by the image obtainment.

5. The non-transitory computer-readable storage medium according to claim 1, wherein
   the first region includes at least a first subregion in which first information is detectable and a second subregion in which second information is detectable, and
   the calculation calculates the second threshold on the basis of a pixel value within the first subregion and a pixel value within the second subregion when at least the first region information is detected by the first region information detection.

6. The non-transitory computer-readable storage medium according to claim 5, wherein the calculation calculates the second threshold on the basis of a brightness value within the first subregion and a brightness value within the second subregion when at least the first region information is detected by the first region information detection.

7. The non-transitory computer-readable storage medium according to claim 6, wherein the calculation calculates, as the second threshold, an average of the brightness value within the first subregion and the brightness value within the second subregion when at least the first region information is detected by the first region information detection.

8. The non-transitory computer-readable storage medium according to claim 1, wherein the output outputs the first region information detected by the first region information detection and the second region information detected by the second region information detection.

9. The non-transitory computer-readable storage medium according to claim 8, wherein the information processing program further causes the computer to provide further operation comprising a processing for performing predetermined information processing on the basis of the first region information and the second region information that are outputted by the output.

10. The non-transitory computer-readable storage medium according to claim 9, wherein the processing selects one piece of image data from a plurality of pieces of image data on the basis of identification information that includes the first region information and the second region information, and displays an image indicated by the selected piece of image data, on a display device.

11. The computer-readable storage medium according to claim 10, wherein the processing displays the image indicated by the selected piece of image data on the display device such that the image indicated by the selected piece of image data is superimposed on the image sequentially obtained by the image obtainment.

12. The non-transitory computer-readable storage medium according to claim 1, wherein
   the information processing program further causes the computer to provide further operation comprising:
      an error detection information detection for detecting error detection information for detecting an error of the second region information on the basis of the second threshold and the pixel value obtained from the second region; and
      a determination for determining whether or not the second region information meets a predetermined condition, by comparing the second region information to the error detection information, and
      the output outputs at least the second region information when a result of the determination by the determination is positive.

13. The non-transitory computer-readable storage medium according to claim 1, wherein the first threshold is a predetermined value.

14. The non-transitory computer-readable storage medium according to claim 1, wherein each of the first region information and the second region information is identification information for identifying the specific object.

15. The non-transitory computer-readable storage medium according to claim 1, wherein the image obtainment sequentially obtains the image from an imaging device connected to the information processing apparatus.

16. An information processing method comprising:
sequentially obtaining an image;
detecting a specific object from the obtained image;
detecting, on the basis of a first threshold and a pixel value obtained from a first region of the detected specific object, first region information on the first region;
calculating a second threshold on the basis of the pixel value obtained from the first region when the first region information is detected;
detecting, on the basis of the second threshold calculated by the calculation and a pixel value obtained from a second region of the detected specific object which second region is different from the first region, second region information on the second region; and
outputting at least the detected second region information.

17. An information processing apparatus comprising:
an image obtaining unit configured to sequentially obtain an image;
a specific object detection unit configured to detect a specific object from the image obtained by the image obtaining unit;
a first region information detection unit configured to detect, on the basis of a first threshold and a pixel value obtained from a first region of the specific object detected by the specific object detection unit, first region information on the first region;
a calculation unit configured to calculate a second threshold on the basis of the pixel value obtained from the first region when the first region information is detected by the first region information detection unit;
a second region information detection unit configured to detect, on the basis of the second threshold calculated by the calculation unit and a pixel value obtained from a second region of the specific object detected by the specific object detection unit which second region is different from the first region, second region information on the second region; and
an output unit configured to output at least the second region information detected by the second region information detection unit.

18. An information processing system comprising:
a computer system, comprising al least one computer processor, being configured to:
sequentially obtain an image;
detect a specific object from the obtained image;
detect, on the basis of a first threshold and a pixel value obtained from a first region of the detected specific object, first region information on the first region;
calculate a second threshold on the basis of the pixel value obtained from the first region when the first region information is detected;
detect, on the basis of the second threshold calculated by the calculation and a pixel value obtained from a second region of the specific object detected by the specific object detection which second region is different from the first region, second region information on the second region; and
output at least the detected second region information.

19. An information processing system comprising:
a marker having a feature of serving as a specific object;
an image obtaining device configured to sequentially obtain an image;
a specific object detection device configured to detect a specific object from the image obtained by the image obtaining device;
a first region information device configured to detect, on the basis of a first threshold and a pixel value obtained from a first region of the specific object detected by the specific object detection device, first region information on the first region;
a calculation device configured to calculate a second threshold on the basis of the pixel value obtained from the first region when the first region information is detected by the first region information detection device;
a second region information detection device configured to detect, on the basis of the second threshold calculated by the calculation device and a pixel value obtained from a second region of the specific object detected by the specific object detection device which second region is different from the first region, second region information on the second region; and
an output device configured to output at least the second region information detected by the second region information detection device.

* * * * *